United States Patent [19]
Bonnet

[11] Patent Number: 5,242,047
[45] Date of Patent: Sep. 7, 1993

[54] EASY MAINTENANCE HIGH SPEED ENDLESS BELT CONVEYOR

[75] Inventor: Henri Bonnet, Atlanta, Ga.

[73] Assignee: United Parcel of America Inc., Atlanta, Ga.

[21] Appl. No.: 818,606

[22] Filed: Jan. 10, 1992

[51] Int. Cl.⁵ .............................................. B65G 39/10
[52] U.S. Cl. .................................................... 198/842
[58] Field of Search ........................................ 198/842

[56] References Cited

U.S. PATENT DOCUMENTS

| | | | |
|---|---|---|---|
| 265,385 | 10/1882 | Clement | 198/842 |
| 1,276,724 | 8/1918 | Cowley | 198/842 X |
| 1,850,891 | 3/1932 | Nyborg | 198/842 X |
| 1,881,184 | 10/1932 | Harris . | |
| 2,158,865 | 5/1939 | Sammon . | |
| 2,171,378 | 8/1939 | Urbanek . | |
| 2,172,378 | 9/1939 | Harris . | |
| 2,172,379 | 9/1939 | Harris . | |
| 2,172,380 | 9/1939 | Harris . | |
| 2,172,381 | 9/1939 | Harris . | |
| 2,271,166 | 1/1942 | Weiss | 198/842 X |
| 2,457,407 | 12/1948 | Sebastian | 198/842 X |
| 2,592,915 | 4/1952 | Lee | 198/842 |
| 2,641,353 | 6/1953 | Weggum | 198/843 X |
| 2,693,269 | 11/1954 | Bentley | 198/842 |
| 2,707,047 | 4/1955 | Ratzer | 198/842 |
| 2,818,966 | 1/1958 | Gill | 198/842 X |
| 2,927,681 | 3/1960 | Moon | 198/842 X |
| 2,964,155 | 12/1960 | Flowers . | |
| 3,105,588 | 10/1963 | Long | 198/842 |
| 3,157,272 | 11/1964 | Bay | 198/842 |
| 3,509,978 | 5/1970 | Bedford . | |
| 3,586,142 | 6/1971 | Inwood . | |
| 3,648,825 | 3/1972 | Burstein | 198/842 X |
| 4,067,428 | 1/1978 | Shuttleworth . | |
| 4,427,106 | 1/1984 | Wooldridge | 198/842 |
| 4,513,859 | 4/1985 | Long . | |

FOREIGN PATENT DOCUMENTS 2447868 4/1976 Fed. Rep. of Germany .

Primary Examiner—D. Glenndayoan
Attorney, Agent, or Firm—James A. Drobile; William H. Murray; Frank M. Linguiti

[57] ABSTRACT

The conveyor system of the present invention provides an endless belt system in which roller assemblies are aligned side by side in rows beneath the upper surface of the endless belt. Each individual roller assembly is provided with a roller and an axis about which the roller rotates. The roller assemblies are disposed in support members by lowering them into a receiving region in the support members. The receiving region is adapted to removably receive the roller assemblies when the roller assemblies are lowered into the receiving region at any angle within a ninety degree range to prevent jamming of the assembly during insertion. The support members rotationally immobilize and retain the axis of the roller assembly while simultaneously providing structural integrity to the conveyor system. The roller shaft is maintained within the support member both by gravity acting upon the roller assembly itself and by the weight of the belt resting upon the roller assembly. The support members are transversely aligned within the frame of the conveyor system to provide rows of removably received roller assemblies. The rollers preferably are further aligned in a longitudinally staggered arrangement.

34 Claims, 4 Drawing Sheets

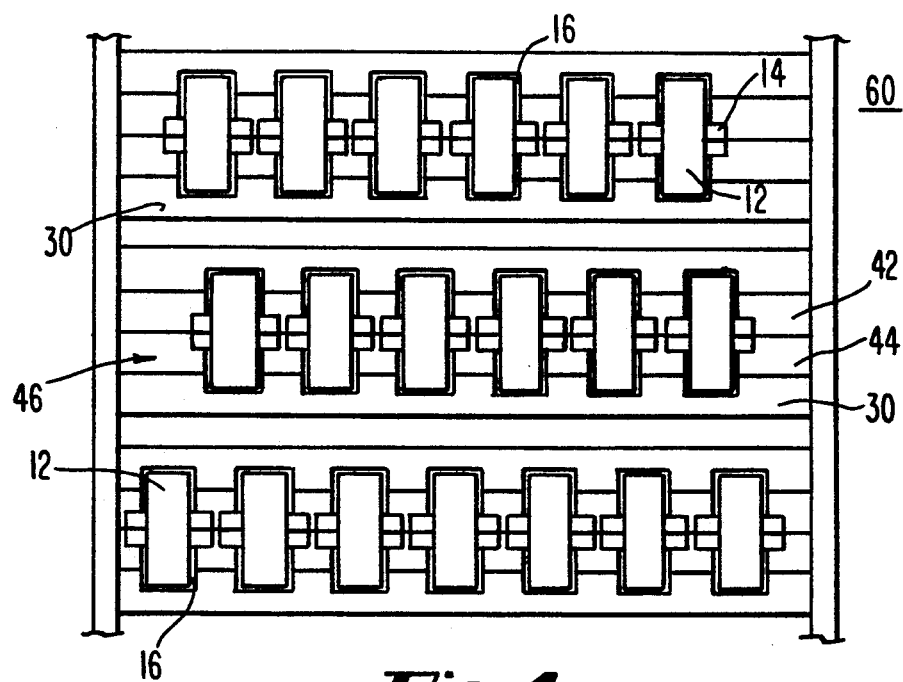
*Fig. 4*
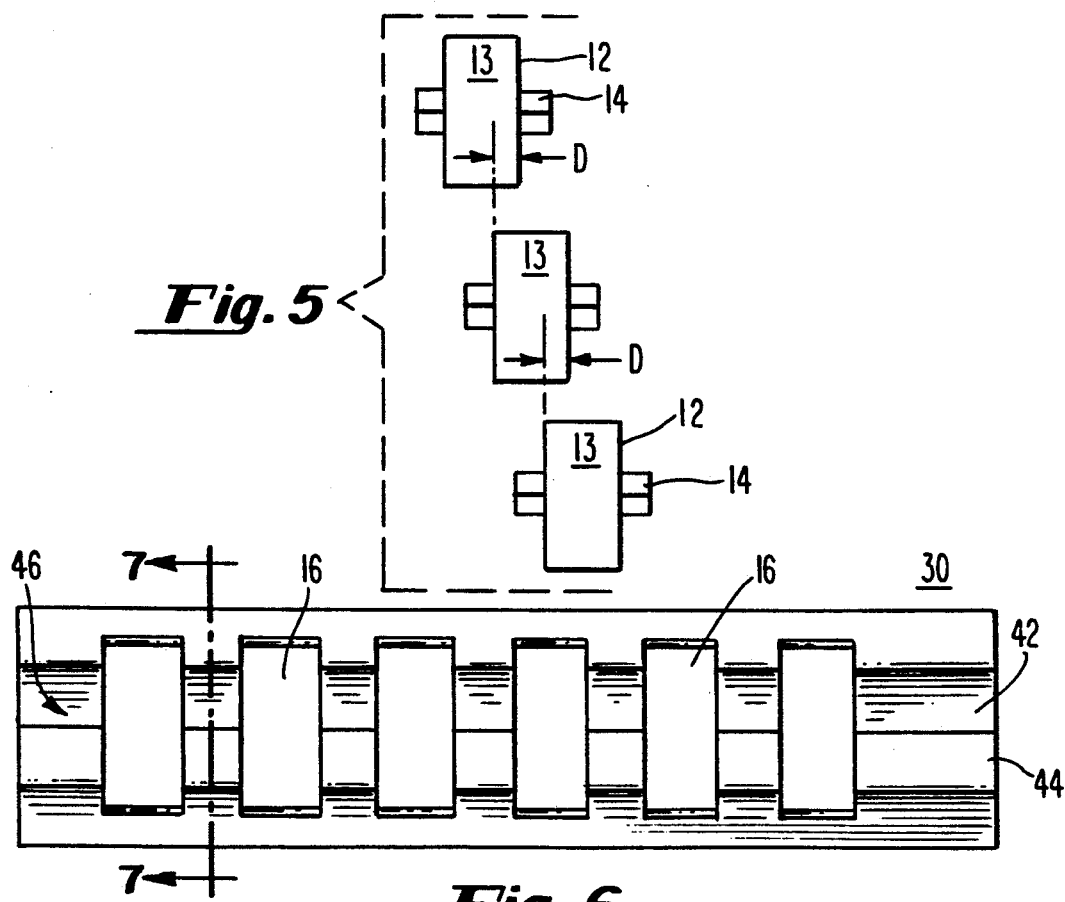
*Fig. 5*
*Fig. 6*

EASY MAINTENANCE HIGH SPEED ENDLESS BELT CONVEYOR

FIELD OF INVENTION

This invention relates to endless belt conveyors, and in particular, to a roller support member for an endless belt

BACKGROUND OF THE INVENTION

Endless belt conveyors, having motor-driven continuous belts extending over rotatable rollers, are widely used for transporting materials over relatively short distances. The faster these conveyor systems are operated, the more efficient the systems are because a greater amount of materials may be transported in the same amount of time. However, increasing the speed at which these conventional conveyors operate causes several problems. As the conveyor belt moves at increasing speeds along the rollers and the slider bed, the friction load, or drag, between the belt and the slider bed increases exponentially. Therefore an exponentially increased amount of energy is required in order to overcome the drag. The force required to overcome the drag at these higher speeds may result in the tearing of the endless belt.

Further, increasing the belt speed of conventional conveyor systems results in an exponential increase in the noise level produced by the rubbing of the conveyor belt along the slider bed and the rollers as well as by the rotation of the rollers themselves. If the noise level is too high, it can damage the hearing of individuals working in the vicinity of these conveyor systems. Therefore, the Occupational Safety and Health Administration has proposed regulations limiting the permitted noise level per conveyor to seventy-five decibels. Many conventional belt conveyors must be operated at relatively slow speeds in order to meet this proposed standard. Operating at these slow speeds results in substantial loss of productivity in transporting materials by conventional belt conveyors.

In addition to these problems, the length of the conveyor belt in conventional conveyor systems is limited. The limitation on the length of the belt is due to the fact that the force needed to overcome drag between the belt and the slider bed and rollers increases as the length of the conveyor belt increases. This also creates the danger of tearing of the belts in these systems. When prior art conveyors are used, three or four conveyors may be required to transport materials over a one thousand foot pathway.

Another problem in the field of conveyor systems is that the variety of materials which may be transported is limited by the configuration of the systems. These systems require rollers to permit the belts to move along the length of the system. The required size of the rollers may vary with the weight and size of the materials being transported along the conveyor. Therefore, in order to transport materials of different weights and sizes along the conveyor, changes in roller size may be necessary in a conveyor system. Changing rollers is a very difficult and time consuming process in prior art systems because considerable disassembly and reassembly is required in order to gain access to the rollers so that they may be removed and replaced. This results in considerable down-time for the conveyor system while the rollers are replaced.

Further, because they are moving parts, the rollers of conveyor systems are subject to wear during normal use. Wear of the rollers requires periodic replacement of the rollers. In conventional belt conveyor systems, roller replacement due to wear requires disassembly and reassembly of the conveyor system to gain access to the rollers in the same manner as that required to change the size of the rollers. Replacing worn rollers in conventional conveyor system thus results in considerable downtime for the conveyor system as previously described for changing the size of the rollers.

SUMMARY OF THE INVENTION

The conveyor system of the present invention is an endless belt conveyor system in which roller assemblies are aligned side by side in rows beneath the surface of an endless belt. The rollers preferably are further aligned in a longitudinally staggered arrangement. Each individual roller assembly is provided with a roller and a shaft about which the roller rotates. The roller assemblies are removably disposed in roller support members by lifting the belt and lowering them into receiving regions in the support members. The receiving regions are adapted to removably receive the roller assemblies without jamming when the roller assemblies are lowered into them or removed from them at any angle within a ninety degree range. The support members of the present invention both carry the roller assemblies and provide structural integrity to the conveyor system. The position of the roller shaft within the receiving region is maintained both by gravity acting upon the roller assembly itself and by the weight of the belt resting upon the roller assembly.

BRIEF DESCRIPTION OF DRAWINGS

FIG. 4 shows a fragmentary plan view of the conveyor roller system of FIG. 1.

FIG. 5 shows a fragmentary plan view of the conveyor roller system of FIG. 1.

FIG. 6 shows a plan view of the support member of the conveyor roller system of FIG. 1.

DETAILED DESCRIPTION OF THE INVENTION

Figure 1:
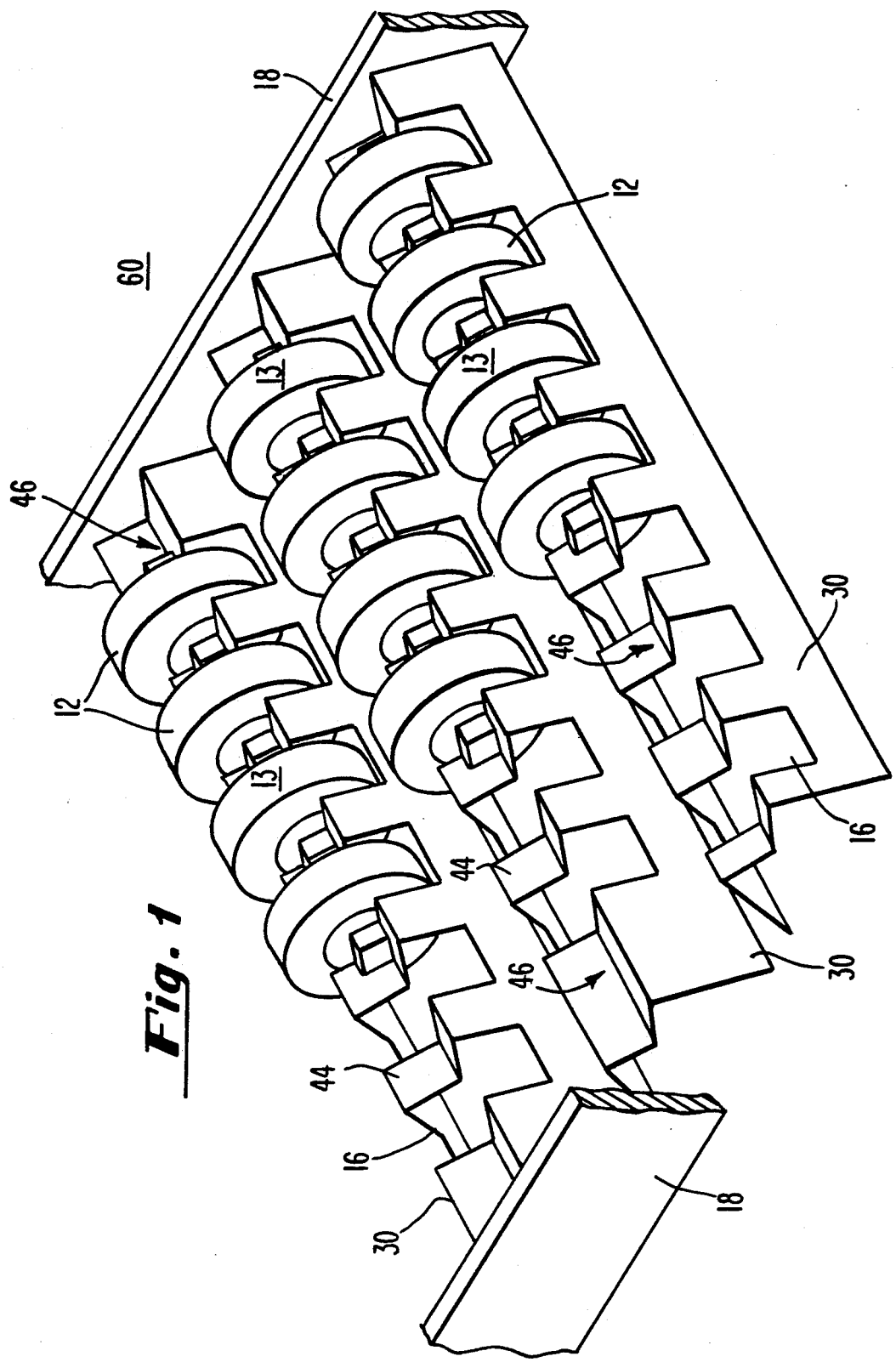
FIG. 1 shows a perspective view of a portion of the conveyor roller system of the present invention.
Figure 3:
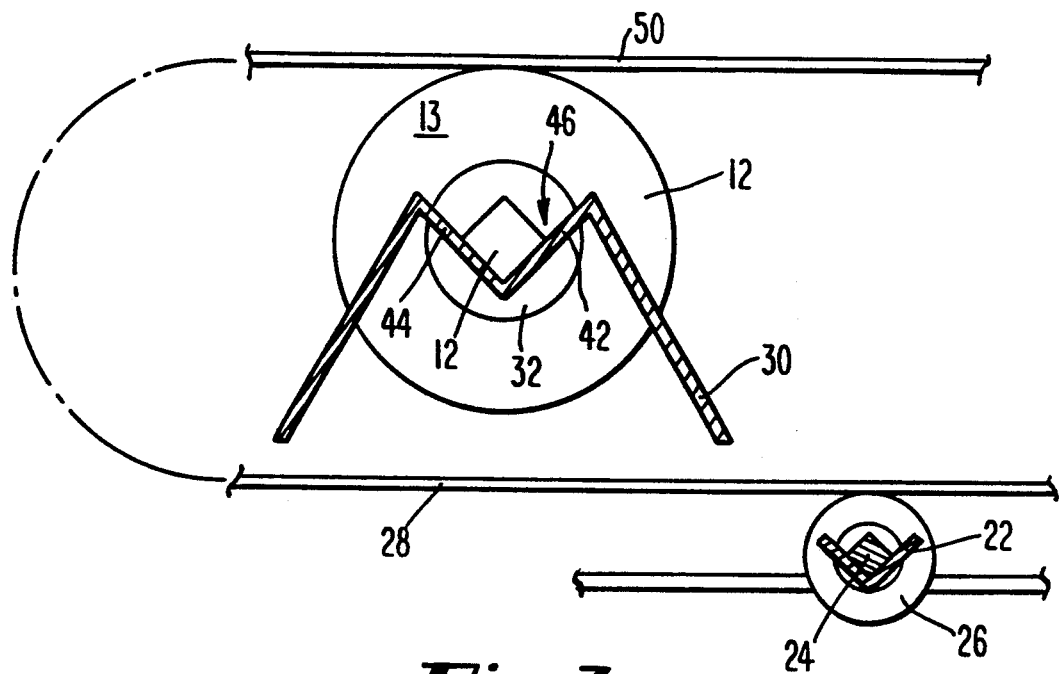
FIG. 3 shows a fragmentary side view of the conveyor roller system of FIG. 1
Figure 2:
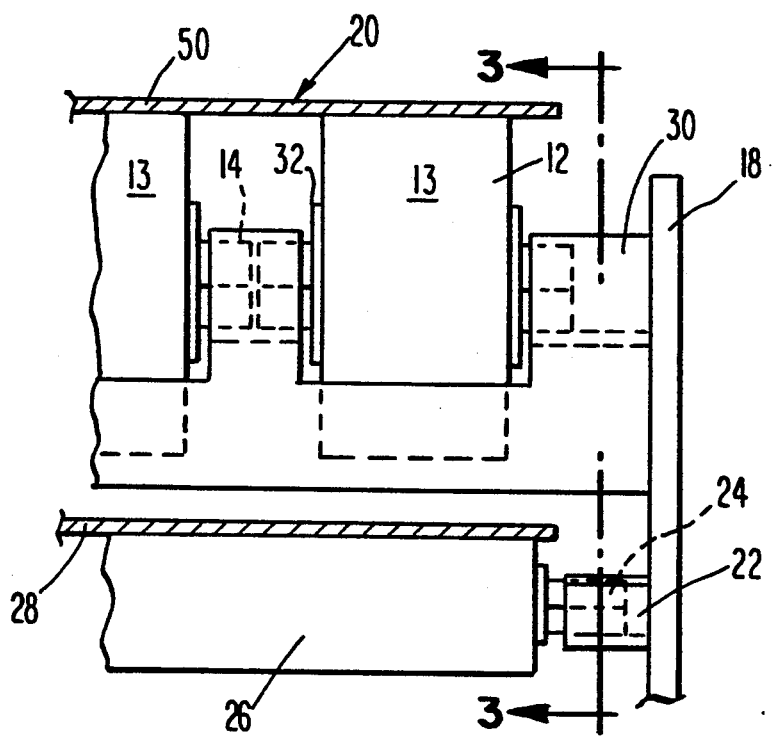
FIG. 2 shows a fragmentary front view of the conveyor roller system of FIG. 1.
Figure 7:
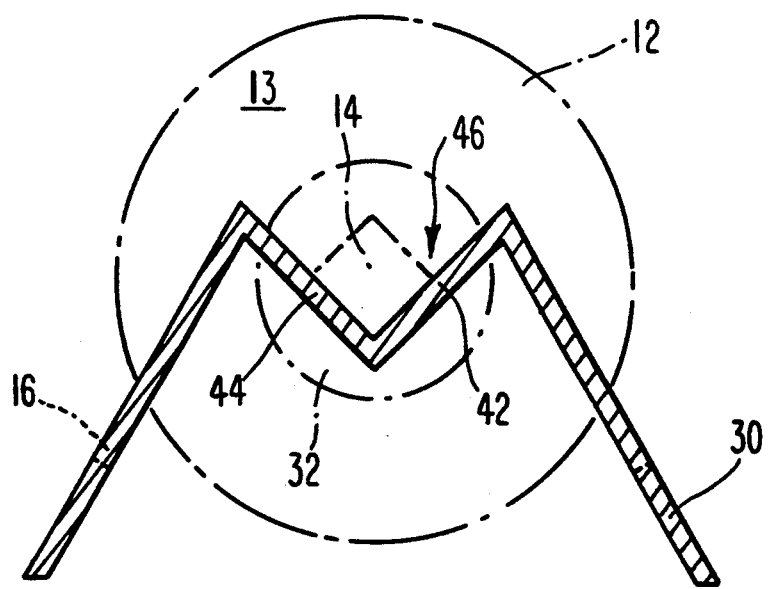
FIG. 7 shows a cross-sectional view of the support member of FIG. 1.
Figure 8:
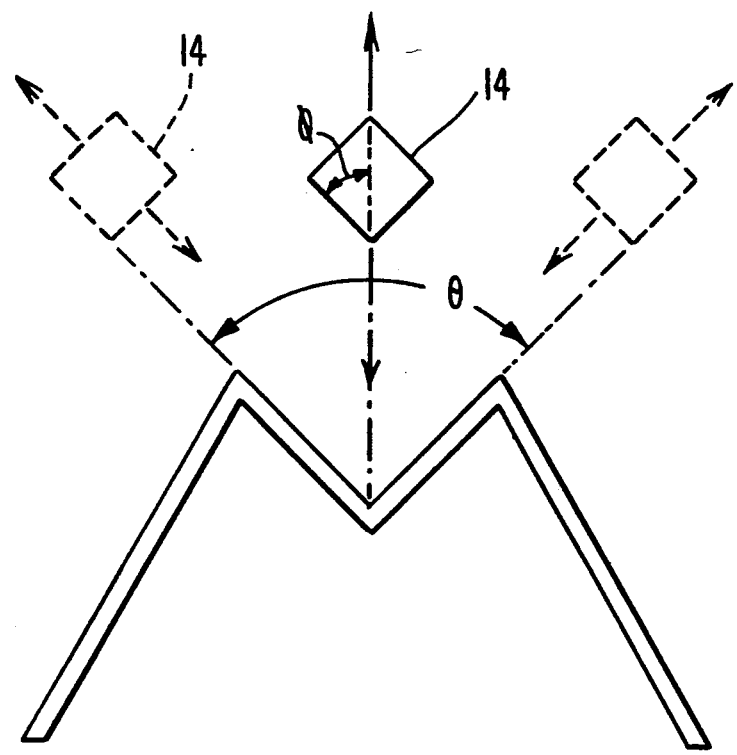
FIG. 8 shows a side view of the support member of FIG. 1 including the range of receiving angles for receiving the assembly shaft of FIG. 1.

Referring now generally to the drawings, there is shown improved conveyor roller system 60 having a plurality of spaced apart removably received conveyor roller assemblies 13. Conveyor roller assemblies 13 of conveyor roller system 60 are each provided with an individual roller wheel 12 and assembly shaft 14 upon which roller wheel 12 is rotably mounted. Endless conveyor belt 20 of conveyor system 60 rests upon roller assemblies 13 and is supported by roller assemblies 13. Roller wheel 12 of conveyor roller assembly 13 is frictionally caused to rotate by contact with conveyor belt 20 as conveyor belt 20 moves during operation of improved conveyor roller system 60.

Support member 30 of conveyor system 60 removably receives and supports assembly shaft 14 of conveyor roller assembly 13. In order to permit assembly shaft 14 to be conveniently inserted into support member 30 and conveniently removed from support member 30, support member 30 is provided with outwardly inclined shaft supporting walls 42, 44. Shaft supporting walls 42, 44 of shaft receiving region 46 are upwardly and outwardly inclined at ninety degrees with respect to each other in order to thereby define shaft receiving region 46 of support member 30. Thus, shaft receiving region 46 is adapted to removably receive and support roller assembly 13 when assembly shaft 14 is lowered into receiving region 46 at an angle which may vary over a ninety degree range. Additionally, shaft receiving region 46 is adapted to release roller assembly 13 when assembly shaft 14 is raised from receiving region 46 at an angle $\theta$ which may vary over ninety degrees.

Assembly shaft 14 of roller assembly 13 is removably mated with shaft receiving region 46 of support member 30 by lowering shaft 14 into receiving region 46 at an angle $\theta$ until assembly shaft 14 comes to rest against inclined shaft supporting walls 42, 44. When assembly shaft 14 is thus removably mated with support member 30, it is rotationally immobilized within support member 30 by shaft supporting walls 42, 44. Because assembly shaft 14 seats properly within receiving region 46 when angle $\theta$ is anywhere within the ninety degree range, easy insertion of roller assembly 13 into receiving region 46 without jamming is permitted. Likewise, easy removal of roller assembly 13 without jamming is permitted because roller assembly 13 may be removed from shaft receiving region 46 of support member 30 by lifting shaft 14 upwardly out of support member 30 along a path that may vary over a ninety degree range.

Furthermore, assembly shaft 14 may be rotated any angle $\phi$ relative to receiving region 46 during insertion and removal of roller assembly 13. Assembly shaft 14 will right itself and seat properly against supporting walls 42, 44 regardless of the shaft rotation angle $\phi$ and at which it is placed against walls 42, 44. Additionally, assembly shaft 14 easily lifts free of supporting wall 42, 44 regardless of the shaft rotation angle $\phi$ and at which it is rotated as it moves from contact with walls 42, 44.

Endless conveyor belt 20 is provided within conveyor system 60 for moving materials in both the forward and reverse longitudinal directions upon roller assemblies 13. The weight of conveyor belt 20 upon roller wheels 12 and the effect of gravity upon roller assemblies 13 themselves, retain roller assembly shafts 14 against the M-shaped surface of support member 30 formed by shaft supporting walls 42, 44. Therefore, installing and removing roller assembly 13 within conveyor system 60 requires only manual lifting of conveyor belt 20 by one person and reaching under conveyor belt 20 with the other hand of the same person, along with manual lowering or raising of roller assembly 13 by the same person. Both support roller assembly 13 and the small section of conveyor belt 20 which must be lifted to gain access to roller assembly 13 are light. Thus, performance of this task does not require an individual with great strength. During operation of conveyor system 60 the weight of materials being transported by conveyor belt 20 also urges roller assembly 13 into receiving region 46.

Furthermore, because roller assembly 13 is secured in its resting location within shaft receiving region 46 by the weight of assembly 13 and the weight of endless belt 20, no further mechanical devices are required to securely retain roller assembly 13 within receiving region 46 while conveyor system 60 is in operation. Because no further mechanical devices secure roller assembly 13 within receiving region 46, no tools are required to insert assembly 13 into region 46 or to remove assembly 13 from region 46.

It will be understood, therefore, that receiving region 46 of support member 30 within conveyor system 60 of the present invention permits efficient insertion and removal of roller assemblies 13. It will also be understood that this efficiency is a result of the fact that roller assemblies 13 are secured within support member 30 by gravity. These features eliminate the need for tools in replacing roller assembly 13 since conveyor belt 20 is merely lifted to permit insertion and removal of roller assembly 13. It will also be understood that this efficiency is further due to the fact that removal and insertion of roller assembly 13 may be performed over a range of ninety degrees. As a result, replacement of roller assemblies 13 may be accomplished with a minimum amount of down-time for conveyor system 60.

In the preferred embodiment of conveyor roller assembly 13, each roller assembly 13 of conveyor system 60 is provided with assembly shaft 14 having a square cross-section. However, it will be understood by those skilled in the art that roller assembly shaft 14 may be formed with a cross-section which may be any polygon, provided that the polygon may be rotationally immobilized within shaft receiving region 46. When a polygon other than a square is provided, shaft receiving region 46 or shaft receiving groove 46 is adapted to removably receive and rotationally immobilize the polygonal shape by adapting the shape of receiving region 46 to the shape of assembly shaft 14. Furthermore, it will be understood that not all angles of the polygon must be equal. Additionally, any type of keyed mating of assembly shaft 14 and shaft receiving region 46 of support member 30 and any type of latching or detent mechanism (not shown) may be used to further secure or rotatably immobilize assembly shaft 14.

Roller wheel 12 of conveyor roller assembly 13 may be provided with self-lubricating bearings 32 having a square raceway to permit rotation of roller wheel 12 about assembly shaft 14. Slotted openings 16 through support member 30 are provided to permit rotation of roller wheel 12 about assembly shaft 14 while shaft 14 is seated in support member 30. Roller wheels 12 of varying sizes may be provided within conveyor system 60 of the present invention as long as the size of roller wheel 12 does not exceed that which can rotate within slotted opening 16. During operation of conveyor system 60 conveyor roller assembly 13 may travel along support member 30 in the transverse direction and bearings 32 may rest against an edge of slotted opening 16.

When heavier loads are transported along conveyor belt 20 of conveyor system 60 of the present invention, smaller roller assemblies 13 may be replaced with larger roller assemblies 13 having larger roller wheels 12. Similarly, roller assemblies 13 having smaller roller wheels 12 may be installed for transporting lighter weight loads. Because of the ease of removing and replacing roller assemblies 13 within receiving region 46, conveyor system 60 is efficient for transporting loads of varying weights and sizes with greatly reduced down-time for replacement of roller wheels 12

Roller wheel 12 and assembly shaft 14 of roller assembly 13 are preferably formed of a conventional noise absorbing plastic. The noise absorbing plastic of roller assembly 13 may, for example, be a plastic such as urethane, nylon, delrin, polyvinylchloride, polyethylene, polypropylene, and the like. Other noise absorbing materials may also be used. Roller assemblies 13 formed of noise-absorbing plastic are advantageous because improved conveyor system 60 may be operated at faster speeds without posing a health risk due to excessive noise levels.

Outwardly inclined shaft supporting walls 42, 44 of support member 30 may be formed by bending a slotted metal sheet into an M-shape to provide contiguous and upwardly and outwardly inclined shaft supporting walls 42, 44. It will be understood by those skilled in the art that shaft supporting structure 42, 44 may be formed by any conventional method which provides a structure for removably receiving, rotationally immobilizing, and gravitationally retaining assembly shaft 14. Additionally, it will be understood that shaft supporting walls 42, 44 need not be contiguous. Shaft supporting walls 42, 44 need only be disposed with respect to each other within sufficient spatial proximity to form a suitable shaft supporting region 46.

Because support members 30 are disposed transversely across conveyor belt 20 and because roller wheels 12 support conveyor belt 20 above support member 30, contact between conveyor belt 20 and support members 30 is minimized. This elimination of contact between conveyor belt 20 and support member 30 greatly decreases frictional drag upon conveyor belt 20 when conveyor system 60 is in operation. By eliminating the drag caused by contact between conveyor belt 20 and support members 30, the force necessary to overcome drag is reduced in conveyor system 60. As a result, conveyor system 60 of the present invention may be operated at faster speeds using substantially less energy to drive conveyor belt 20. Thus, conveyor system 60 may be operated less expensively and at faster speeds than conventional systems.

The reduction of drag within conveyor system 60 also provides other benefits. Because less force is required to move conveyor belt 20, it is less likely that conveyor belt 20 of improved conveyor system 60 will tear at faster speeds. Diminishing drag and the force to overcome drag also permits the forming of longer conveyer sections. Finally, diminishing drag diminishes the noise produced when conveyor system 60 is operated at faster speeds.

Conveyor belt 20 of improved conveyor system 60 is formed of upper belt portion 50 at the top of system 60 and, travelling in the opposite direction, lower belt portion 28 at the bottom of system 60. As conveyor belt 20 is operated, contact between the underside of upper belt portion 28 of belt 20 and the top of roller wheel 12 causes roller wheel 12 to rotate as previously described. A line-shaped contact region is thus defined between roller wheel 12 and conveyor belt 20. This contact region is relatively narrow and has a length equal to the width of roller wheel 12. The small size of the contact regions between roller wheels 12 and conveyor belt 20 also helps limit friction and therefore drag, noise, and energy consumption within conveyor system 60.

In a similar manner, the under side of lower belt portion 28 of conveyor belt 20 makes contact with the top of return roller 26 and return roller 26 is frictionally caused to rotate by conveyor belt 20 as conveyor belt 20 moves. The contact region between the top of return roller 26 and conveyor belt 20 is also a line.

In conveyor system 60, a plurality of roller assemblies 13 are aligned side by side along each support member 30 with roller wheel 12 of each roller assembly 13 disposed within its individual slotted opening 16 through support member 30. Roller assemblies 13 are further arranged within conveyor system 60 so that roller wheel 12 of each width-wise row of roller assemblies 13 longitudinally overlaps roller wheel 12 of an adjacent widthwise row by distance D. Thus the distance of a roller wheel 12 from a side of conveyor belt 20 differs by D from the distance of from the side of conveyor belt 20 of a corresponding roller wheel 12 disposed on an adjacent row of roller wheels 12.

Because of this staggered arrangement of roller wheels 12, the load of materials transported upon conveyor belt 20 may be exerted upon all areas of belt 20 evenly. Because all regions of conveyor belt 20 are equally supported by roller wheels 12 in this staggered arrangement the useful life of conveyor belt 20 is increased. In the preferred embodiment of conveyor system 60 of the present invention distance D may be approximately 10% of the width of roller wheel 12. However, it is understood that distance D may be between about 5% and about 10%, or even between about 1% and 10% of the width of roller wheels 12. It is believed that increasing distance D beyond 10% provides little increase in performance of conveyor system 60.

Side frames 18 are provided within improved conveyor system 60 of the present invention to provide a supporting structure for support members 30. A plurality of support members 30 are transversely disposed between side frames 18 and fixedly attached to the inner surfaces of side frames 18. Support members 30 thereby form part of the framework of conveyor system 60 and thereby provide structural integrity to conveyor system 60, in cooperation with side frames 18. Thus, dual purpose support members 30 serve to simultaneously provide both (1) support for rows of conveyor roller assemblies 13 and (2) structural integrity to conveyor system 60.

Because dual-purpose support members 30 provide structural integrity to conveyor system 60, further conventional bracing structures are not required. Therefore, conveyor system 60 may be constructed thinner and more compactly in the vertical direction. Because conveyor system 60 of the present invention is provided with dual purpose support members 30 and therefore may be constructed more compactly than prior art conveyor systems, vertical stacking of additional conveyor systems 60 within a region may be permitted. This permits a greater number of transportation paths through the region.

Improved conveyor system 60 may be provided with a plurality of angle saddles 22. Angle saddles 22 may be mounted on the inside surface of frame sides 18. Return roller shaft 14 of return roller 26 is removably received within angle saddle 22. Angle saddle 22 is defined by shaft supporting walls 34, 36 which are upwardly and outwardly inclined at a ninety-degree angle with respect to each other. Shaft supporting walls 34, 36 of angle saddle 22 may be either contiguous or non-contiguous.

Return roller shaft 14 is removably disposed within angle saddle 22 by lowering return roller shaft 14 into angle saddle 22 until return roller shaft 14 comes to rest against shaft supporting walls 34, 36. Return roller shaft 14 is rotationally immobilized within angle saddle 22 by shaft supporting sides 34, 36. Return roller 26 may be removed from angle saddle 22 by raising lower belt portion 28 of conveyor belt 20 and lifting return roller shaft 24 upwardly out of angle saddles 22.

The weight of lower belt portion 28 of conveyor belt 20 and gravity acting upon return roller 26 serve to retain return roller shaft 14 against shaft supporting sides 34, 36. Return roller 13 is removable from angle saddle 22 without the use of tools.

While this invention has been described with reference to specific, and particularly preferred, embodiments thereof, it is not limited thereto and the appended claims are intended to be construed to encompass not only the specific forms and variants of the invention shown but to such other forms and variants as may be devised by those skilled in the art without departing from the true spirit and scope of this invention.

What is claimed is:

1. An endless belt conveyor system for moving materials, comprising:
    roller means having an axis for permitting rotation of said roller means;
    roller support means having receiving means for removably receiving and mating with said axis when said axis is disposed at a receiving angle with respect to said receiving means;
    said receiving means being adapted to rotationally immobilize said axis when said axis is mated with said receiving means; and,
    a receiving region defined between receiving surfaces of said receiving means, said receiving region adapted to allow said axis to pass freely therethrough when said axis is disposed at a continuous range of said receiving angles while said axis is being received by said receiving means.

2. The endless belt conveyor system of claim 1, wherein said receiving surfaces comprise first and second receiving walls for defining said region between said first and second walls.

3. The endless belt conveyor system of claim 2, wherein each of said first and second receiving walls is inclined upwardly and outwardly from the other.

4. The endless belt conveyor system of claim 2, wherein said first and second receiving walls are contiguous.

5. The endless belt conveyor system of claim 2, wherein said first and second receiving walls define a central groove within said receiving means.

6. The endless belt conveyor system of claim 1, wherein said roller support means is provided with an opening therethrough, said opening adapted to permit rotation of said roller means therein.

7. The endless belt conveyor system of claim 6, further comprising a plurality of said openings, wherein the openings of said plurality of openings are spaced apart along said roller support means.

8. The endless belt conveyor system of claim 1, wherein said roller means is formed of a noise absorbing material.

9. The endless belt conveyor system of claim 1, wherein said receiving means is adapted to permit removal of said axis from said receiving means at a ninety degree range of removal angles.

10. The endless belt conveyor system of claim 1, wherein said axis comprises a shaft and bearing means for permitting rotation of said roller about said axis.

11. The endless belt conveyor system of claim 10, wherein said bearing means comprises a square raceway.

12. The endless belt conveyor system of claim 1, further comprising a plurality of said roller support means and a plurality of roller means disposed upon said roller support means, said plurality of roller means being arranged along said roller support means to form a plurality of rows of roller means.

13. The endless belt conveyor system of claim 12, wherein said roller means have roller widths, further comprising first and second roller means disposed upon respective first and second rows of roller means at respective first and second distances from a side edge of said conveyor system, said first and second distances differing from each other by a portion of said roller width.

14. The endless belt conveyor system of claim 13, wherein said first and second distances differ from each other by less than approximately 10% of said roller width.

15. The endless belt conveyor system of claim 1, wherein said range of receiving angles comprises ninety degrees.

16. The endless belt conveyor system of claim 1, wherein said roller means is retained within said receiving means only by gravity.

17. The endless belt conveyor system of claim 1, further comprising belt means, wherein said belt means is disposed upon said roller means to gravitationally urge said roller means toward said receiving means and retain said roller means upon said receiving means.

18. The endless belt conveyor system of claim 1, wherein said roller means is gravitationally urged toward said receiving means and gravitationally retained upon said receiving means by said roller means.

19. The endless belt conveyor system of claim 1, having side frame means for providing structural integrity to said conveyor system wherein said roller support comprises frame brace means to provide structural integrity to said conveyor system in cooperation with said side frame means.

20. The endless belt conveyor system of claim 19, wherein said frame brace means is formed only of said roller support means.

21. The endless belt conveyor system of claim 1, wherein said roller support means comprises a substantially M-shaped surface.

22. The endless belt conveyor system of claim 1, wherein said support means comprises an angle saddle.

23. An endless belt conveyor system for transporting objects longitudinally along said system, comprising:
    roller means for rotating when said objects are transported;
    roller support means having an M-shaped surface for supporting said roller means;
    frame means for supporting said conveyor system said frame means having means for maintaining transverse integrity and means for maintaining longitudinal integrity; and,
    said means for maintaining transverse integrity being formed only by said roller support means bracingly coupled to said means for maintaining longitudinal integrity of said frame means.

24. The endless belt conveyor system of claim 23, wherein said roller support means is disposed transversely across said conveyor system.

25. The endless belt conveyor system of claim 23, wherein said roller support means supports a pluurality of said roller means.

26. The endless belt conveyor system of claim 23, wherein a belt of said belt conveyor system urges said roller means against said roller support means.

27. The endless belt conveyor system of claim 23, wherein said roller means is provided with an axis and said roller support means further comprises receiving means for receiving and rotationally immobilizing said axis when said axis is inserted into said receiving means at a receiving angle.

28. The endless belt conveyor system of claim 27, wherein said receiving means is adapted to removably receive said axis at a range of receiving angles.

29. The endless belt conveyor system of claim 27, wherein said receiving means comprises first and second receiving walls.

30. The endless belt conveyor system of claim 23, wherein said roller support means is provided with an opening therethrough, said opening adapted to permit rotation of said roller means therein.

31. The endless belt conveyor system of claim 23, further comprising first and second roller means disposed upon respective first and second roller support means at respective first and second distances from a side edge of said conveyor system, said first and second distances differing from each other by a portion of the width of said roller width.

32. The endless belt conveyor system of claim 31, wherein said first and second distances differ from each other by less than approximately 10% of said roller width.

33. The endless belt conveyor system of claim 27, wherein said roller means is gravitationally urged toward said receiving means and retained within said receiving means by said roller means.

34. The endless belt conveyor system of claim 27, wherein said receiving means is adapted to permit removal of said axis from said receiving means at a ninety degree range of removal angles.

* * * * *